US012804078B2

(12) United States Patent
Zhang

(10) Patent No.: US 12,804,078 B2
(45) Date of Patent: Nov. 17, 2026

(54) METHOD AND SYSTEM FOR IMPLEMENTING SIMULTANEOUS INTERPRETATION IN CALL PROCEDURE, AND STORAGE MEDIUM

(71) Applicant: ZTE Corporation, Shenzhen (CN)

(72) Inventor: Wenyan Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 145 days.

(21) Appl. No.: 18/439,644

(22) Filed: Feb. 12, 2024

(65) Prior Publication Data

US 2024/0187529 A1 Jun. 6, 2024

Related U.S. Application Data

(63) Continuation of application No. PCT/CN2022/091522, filed on May 7, 2022.

(30) Foreign Application Priority Data

Aug. 13, 2021 (CN) ......................... 202110929389.8

(51) Int. Cl.
*H04M 3/58* (2006.01)
*H04M 3/22* (2006.01)

(52) U.S. Cl.
CPC ............... *H04M 3/58* (2013.01); *H04M 3/22* (2013.01); *H04M 2201/40* (2013.01)

(58) Field of Classification Search
CPC ...... H04M 3/58; H04M 3/22; H04M 2201/40; H04M 3/56; H04M 2203/2061;
(Continued)

(56) References Cited

U.S. PATENT DOCUMENTS 7,054,804 B2 * 5/2006 Gonzales ................ G06F 40/58 704/8
7,130,790 B1 * 10/2006 Flanagan ................ G06F 40/58 348/468
(Continued)

FOREIGN PATENT DOCUMENTS

CN 111478971 A 7/2020
CN 113079142 A 7/2021
(Continued)

OTHER PUBLICATIONS

International Search Report and Written Opinion for International Application No. PCT/CN2022/091522, mailed on Aug. 5, 2022, 10 pages with English translation.
(Continued)

*Primary Examiner* — Lisa Hashem
(74) *Attorney, Agent, or Firm* — Ashurst Perkins Coie US LLP

(57) ABSTRACT

Provided are a method and system for implementing simultaneous interpretation in a call procedure, and a storage medium. A data channel and a new media channel are established on a network side, a simultaneous interpretation request is received through the data channel, point-to-point audio and video call media is anchored to the new media channel, a voice media stream is recognized and translated into a target language, and therefore simultaneous interpretation is implemented on the network side.

20 Claims, 4 Drawing Sheets

(58) Field of Classification Search
CPC ..... H04M 7/0042; H04M 7/006; G06F 40/40; G06F 40/58; G10L 15/26; H04L 65/80; H04L 65/1016; H04N 7/147
See application file for complete search history.

(56) References Cited

U.S. PATENT DOCUMENTS

| | | | | |
|---|---|---|---|---|
| 7,738,833 | B2 * | 6/2010 | Bettis | H04M 3/5315 455/414.1 |
| 8,914,276 | B2 * | 12/2014 | Reitan | H04N 9/8233 704/275 |
| 2005/0225628 | A1 * | 10/2005 | Antoniou | H04L 65/401 348/E7.083 |
| 2006/0227240 | A1 * | 10/2006 | Chiu | H04N 21/4884 348/383 |
| 2006/0259307 | A1 | 11/2006 | Sanders et al. | |
| 2007/0189724 | A1 * | 8/2007 | Wan | G06F 40/58 386/329 |
| 2011/0246172 | A1 * | 10/2011 | Liberman | H04M 3/56 348/14.09 |
| 2013/0332144 | A1 | 12/2013 | Chaturvedi et al. | |
| 2014/0242955 | A1 | 8/2014 | Kang et al. | |
| 2015/0347399 | A1 | 12/2015 | Aue et al. | |
| 2018/0013893 | A1 * | 1/2018 | Cohen | G06Q 10/02 |
| 2024/0187529 | A1 * | 6/2024 | Zhang | H04M 7/0042 |
| 2024/0372740 | A1 * | 11/2024 | Hannun | G06F 40/263 |
| 2025/0045536 | A1 * | 2/2025 | Bennett | G10L 15/16 |
| 2025/0322181 | A1 * | 10/2025 | Moy | H04N 7/147 |
| 2025/0337605 | A1 * | 10/2025 | Hughes, Jr. | H04L 12/1813 |
| 2026/0087272 | A1 * | 3/2026 | Ewers | G06F 40/58 |

FOREIGN PATENT DOCUMENTS

| | | | |
|---|---|---|---|
| CN | 113726952 | A | 11/2021 |
| EP | 2621140 | * | 7/2013 |
| EP | 2621140 | A1 | 7/2013 |

OTHER PUBLICATIONS

Partial European Search Report issued in EP Patent Application No. 22854982.0, dated Oct. 11, 2024, 11 pages.

* cited by examiner

METHOD AND SYSTEM FOR IMPLEMENTING SIMULTANEOUS INTERPRETATION IN CALL PROCEDURE, AND STORAGE MEDIUM

CROSS-REFERENCE TO RELATED APPLICATIONS

This application is a continuation of International Patent Application No. PCT/CN2022/091522, filed on May 7, 2022, which claims priority to Chinese Patent Application No. 202110929389.8, filed on Aug. 13, 2021, the disclosures of each of which are incorporated herein by reference in their entireties.

FIELD

The disclosure relates but is not limited to the technical field of communication, and particularly relates to a method and system for implementing simultaneous interpretation in a call procedure, and a storage medium.

BACKGROUND

In a traditional call service scenario, only a point-to-point audio and video media channel is established between a calling terminal and a called terminal, but synchronous interaction scenarios other than calls cannot be achieved. If simultaneous interpretation is required in a call procedure, a multi-party call with a third party involved is required. Alternatively, a voice recognition application on a terminal side is required to recognize and translate call content.

In common scenarios in need of simultaneous interpretation, such as telephone booking, ticket changing and meal ordering during a foreign trip of a user, technical communication with business customers, or emergency calls abroad, communication will be difficult in the absence of in-time call support from a third party or corresponding voice recognition application on a terminal, which brings considerable inconvenience to the user.

SUMMARY

An embodiment of the disclosure provides a method for implementing simultaneous interpretation on a network side in a call procedure.

In a first aspect, an embodiment of the disclosure provides a method for implementing simultaneous interpretation in a call procedure. The method includes: establishing a data channel based on a received call request; receiving a simultaneous interpretation request that is initiated by a terminal through the data channel; anchoring call media to a new media channel; executing a simultaneous interpretation service; and sending, to the terminal, a processing result of the simultaneous interpretation service through the data channel.

In a second aspect, an embodiment of the disclosure provides a system for implementing simultaneous interpretation in a call procedure. The system includes an access control entity, a call application server, a service application server, a media resource server and an application entity. The access control entity is configured to respectively establish channels with a terminal and the media resource server. The call application server is respectively interfaced with the service application server, the media resource server and the application entity. The service application server is configured to perform signaling interaction with the call application server and the application entity, and the service application server is configured to perform data transmission with the media resource server and the application entity. The media resource server is interfaced with the application entity and configured to forward application data.

In a third aspect, an embodiment of the disclosure provides a computer-readable storage medium. The computer-readable storage medium stores a computer-executable instruction. The computer-executable instruction is configured to execute the method as described in the first aspect.

BRIEF DESCRIPTION OF THE DRAWINGS

The accompanying drawings are used for providing further understanding of the technical solutions of the disclosure as a constitute part of the disclosure, and are used for explaining the technical solutions of the disclosure along with the embodiments of the disclosure without constituting a limitation on the technical solutions of the disclosure.

DETAILED DESCRIPTION OF EMBODIMENTS

Figure 1:
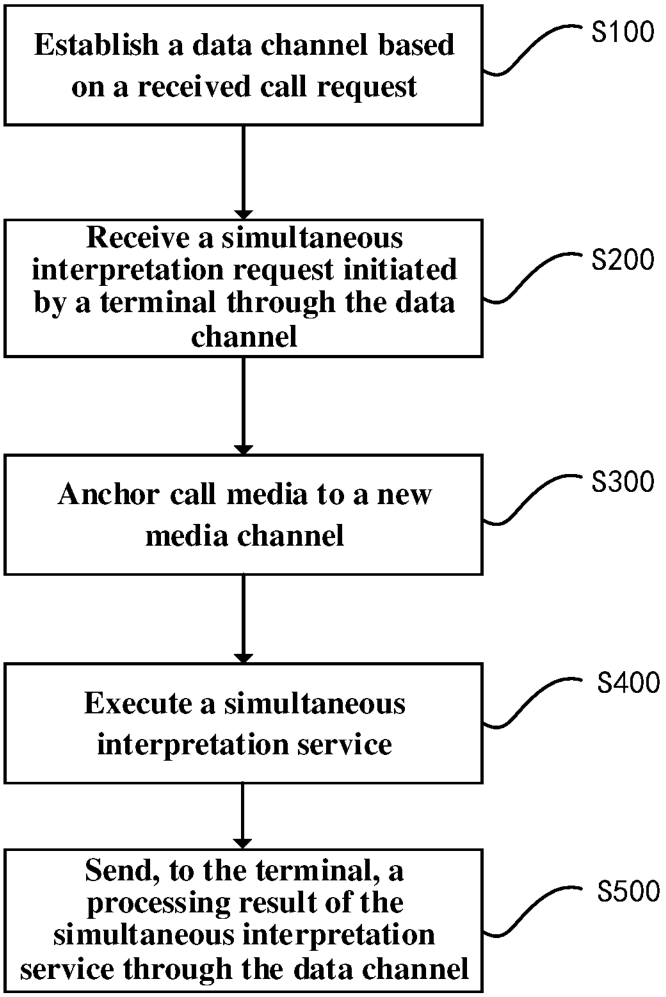
FIG. 1 is a flow diagram of a method for implementing simultaneous interpretation in a call procedure according to an embodiment of the disclosure.

In order to make the objectives, technical solutions and advantages of the disclosure clearer and more understandable, the disclosure will be further described in detail below in combination with the accompanying drawings and embodiments. It should be understood that the particular embodiments described herein are merely used to explain the disclosure, and are not used to limit the disclosure.

Although logical sequences are shown in the accompanying drawings of the disclosure, in some cases, the steps shown or described can be executed in sequences different from those in the accompanying drawings. The terms "first", "second", etc. in the description, claims and the above accompanying drawings are used to distinguish similar objects, but are not necessarily used to describe specific sequences or precedence orders.

An internet protocol multimedia subsystem (IP multimedia subsystem, IMS) is a subsystem proposed by a third generation partnership project (3GPP) to support an IP multimedia service, and is a necessary solution for a voice over new radio (VoNR) call by a fifth generation mobile communication technology (5G) network. Moreover, the 3GPP R16 standard introduces an IMS data channel mechanism. An enhanced form of a call service is implemented through high bandwidth and low delay of the 5G network. High definition, visualization and interactivity are achieved. New interactive and immersive service experience is provided while a call service is provided for a user.

On this basis, the disclosure provides a method and system for implementing simultaneous interpretation in a call procedure, and a storage medium. A data channel is established for data transmission, a new media channel is introduced, and a point-to-point audio and video call media is anchored to the new media channel for simultaneous interpretation. Therefore, the problem that the traditional point-to-point audio and video media channel cannot achieve a synchronous interaction scenario other than a call is solved. According to embodiments of the disclosure, real-time voice recognition and synchronous translation based on an IMS network side are implemented in a call procedure, and recognition and translation results are transmitted to a terminal synchronously through a data channel, such that a simultaneous interpretation service of audio and video calls are implemented.

In the disclosure, the terminal may be divided into a calling terminal and a called terminal. The calling terminal indicates a terminal initiating a call and the called terminal indicates a terminal called. It is not indicated that a terminal is limited to a calling terminal or a called terminal. For instance, in a case that terminal A initiates a call to terminal B, terminal A is a calling terminal and terminal B is a called terminal; in a case that terminal B initiates a call to terminal A, terminal B is a calling terminal and terminal A is a called terminal.

The embodiments of the disclosure will be described in detail below in combination with the accompanying drawings.

FIG. 1 is a flow diagram of a method for implementing simultaneous interpretation in a call procedure according to an embodiment of the disclosure. As shown in FIG. 1, the method includes at least S100-S500.

S100: a data channel is established based on a received call request.

S200: a simultaneous interpretation request that is initiated by a terminal is received through the data channel.

S300: call media is anchored to a new media channel.

S400: a simultaneous interpretation service is executed.

S500: a processing result of the simultaneous interpretation service is sent to the terminal through the data channel.

When a call request of a terminal is received, for instance, when terminal A is to initiate a call to terminal B, data channels are established based on the call request, for instance, data channels leading to terminal A and terminal B are respectively established. Correspondingly, when a simultaneous interpretation request that is initiated by the terminal through the data channel is received, it should be understood that a calling terminal may initiate a simultaneous interpretation request through a data channel, and a called terminal may also initiate a simultaneous interpretation request through a data channel. For instance, in a process that user A uses terminal A to make a call to terminal B of user B, the user A may initiate a simultaneous interpretation request by terminal A, and user B may also initiate a simultaneous interpretation request by terminal B. After the simultaneous interpretation request is received, the call media is anchored to a new media channel. That is, the call media is removed from a traditional point-to-point audio and video media channel, and another new media channel is used. Thus, a limitation that the point-to-point audio and video media channel can only perform a call is avoided, and a simultaneous interpretation service is performed. Then, a processing result of the simultaneous interpretation service is sent to the terminal through the data channel. The processing result of the simultaneous interpretation service includes but is not limited to a translation result. For instance, in a case that user A initiates a simultaneous interpretation request by terminal A, a processing result of the simultaneous interpretation service is sent to terminal A.

According to the embodiment of the disclosure, simultaneous interpretation can be implemented on a network side. The call media is anchored to the new media channel by establishing the new media channel, and simultaneous interpretation is implemented through the data channel. Thus, one or more parties using different languages can freely make calls, and convenience is provided for users.

In some embodiments of the disclosure, before the data channel is established, a call status of the terminal is subscribed. The call status of the terminal includes a calling state and a called state. A terminal performing calling is a calling terminal, and a terminal called is a called terminal. By subscribing the call status of the terminal, a current call status of the terminal may be known. When a terminal initiates a call request, a data channel may be established in time based on the call request, which is conducive to acceleration of establishment of the data channel.

Figure 2:
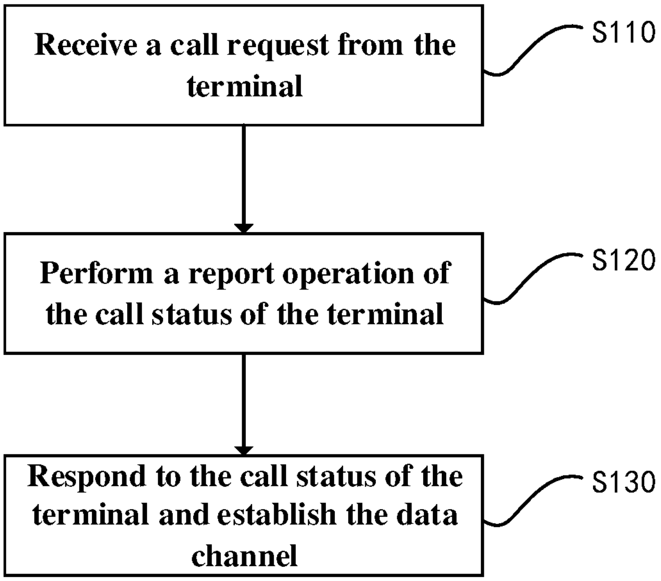
FIG. 2 is a flow diagram of establishing a data channel according to an embodiment of the disclosure.

FIG. 2 shows a flow diagram of establishing a data channel. As shown in FIG. 2, the method includes at least S110-S130.

S110: a call request is received from a terminal.

S120: a reporting operation of a call status of the terminal is performed.

S130: the call status of the terminal is responded to and a data channel is established.

In some embodiments of the disclosure, a process as shown in FIG. 2 is performed to establish the data channel. It can be understood that terminal A initiates a call request as a calling terminal, a reporting operation of a call status (such as a calling status) of terminal A is performed after the call request from terminal A is received, and a data channel leading to terminal A is established upon responding to the call status.

Figure 3:
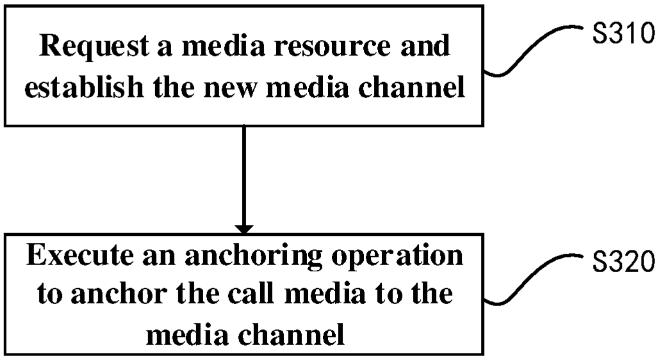
FIG. 3 is a flow diagram of performing an anchoring operation according to an embodiment of the disclosure.

FIG. 3 is a flow diagram of an anchoring operation according to an embodiment of the disclosure. As shown in FIG. 3, anchoring the call media to the new media channel includes at least S310 and S320.

S310: a media resource is requested and the new media channel is established.

S320: the anchoring operation is executed to anchor the call media to the media channel.

In order to solve the problem that a point-to-point audio and video media channel cannot achieve a synchronous interaction scenario other than a call, a method for anchoring call media to a new media channel is provided. By requesting the media resource and establishing the new media channel, the anchoring operation is performed to anchor the call media to the new media channel. Thus, the terminal can perform simultaneous interpretation by the new media channel. Moreover, by anchoring the call media to the new media channel, security of data transmission between the terminal and the network side can be improved, and information leakage is effectively prevented.

Figure 4:
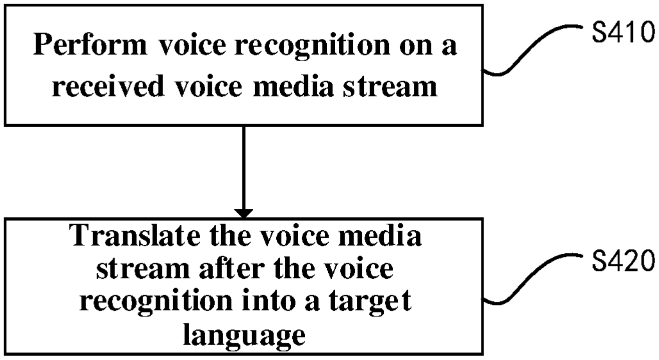
FIG. 4 is a flow diagram of executing a simultaneous interpretation service according to an embodiment of the disclosure.

FIG. 4 is a flow diagram of executing a simultaneous interpretation service according to an embodiment of the disclosure. As shown in FIG. 4, executing the simultaneous interpretation service includes at least S410 and S420.

S410: voice recognition is performed on a received voice media stream.

S420: the voice media stream after the voice recognition is translate into a target language.

When the simultaneous interpretation service is executed, voice recognition is performed on the received voice media stream. It can be understood that terminal A, as a calling terminal, makes a call with terminal B, terminal A initiates a simultaneous interpretation request, and voice recognition, such as language recognition and voice content information recognition, is performed on the voice media stream (the voice media stream carries voice communication content of terminal B) sent by terminal B. The recognized voice is translated into a target language, and the target language is a language selected by a terminal initiating the simultaneous request. For instance, in a case that terminal A selects Chinese as the target language, the recognized voice is translated into Chinese.

Figure 5:
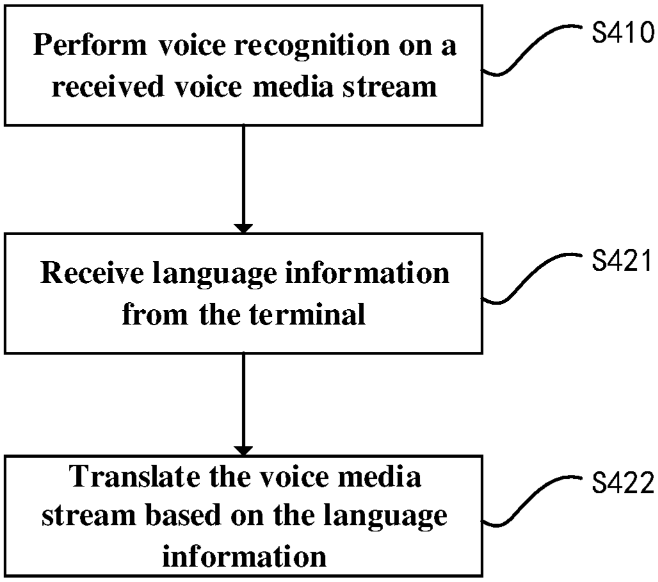
FIG. 5 is a flow diagram of executing a simultaneous interpretation service according to another embodiment of the disclosure.

FIG. 5 is a flow diagram of executing a simultaneous interpretation service according to another embodiment of the disclosure. As shown in FIG. 5, executing the simultaneous interpretation service includes at least S410-S420.

S410: voice recognition is performed on a received voice media stream.

S421: language information is received from the terminal.

S422: the voice media stream is translated based on the language information.

Translating the voice media stream after the voice recognition into the target language includes: receiving the language information from the terminal; and translating the voice media stream based on the language information. It can be understood that in an instance that user A uses the terminal A as a calling terminal to make a call with the terminal B, and the terminal A initiates a simultaneous interpretation request, the language information is a language of a target language selected by the user A on the terminal A, and the recognized voice is translated based on the language information selected by the user A by the terminal A.

In some embodiments of the disclosure, a processing result of the simultaneous interpretation service includes but is not limited to a recognition and translation result, and the processing result of the simultaneous interpretation service may be displayed on the terminal, such as on a user interface of the terminal. It can be understood that the processing result of the simultaneous interpretation service is sent to the terminal from the network side, and the processing result may be displayed on the terminal after the user receives the processing result.

In some embodiments of the disclosure, the processing result of the simultaneous interpretation service is displayed on the terminal in a form of subtitles. It can be understood that after the voice media stream is translated, a voice media stream re-sent to the terminal initiating simultaneous interpretation includes a translation. After the terminal receives the translation, the translation may be displayed in a form of subtitles that are convenient for users to read and communicate, and convenience is provided for users. The subtitles may be displayed in a scrolling manner or a fixed manner. In the scrolling manner, the translation scrolls and is refreshed, for instance, horizontally scrolls along a display interface. In the fixed display manner, the translation is displayed at a fixed position and refreshed.

Figure 6:
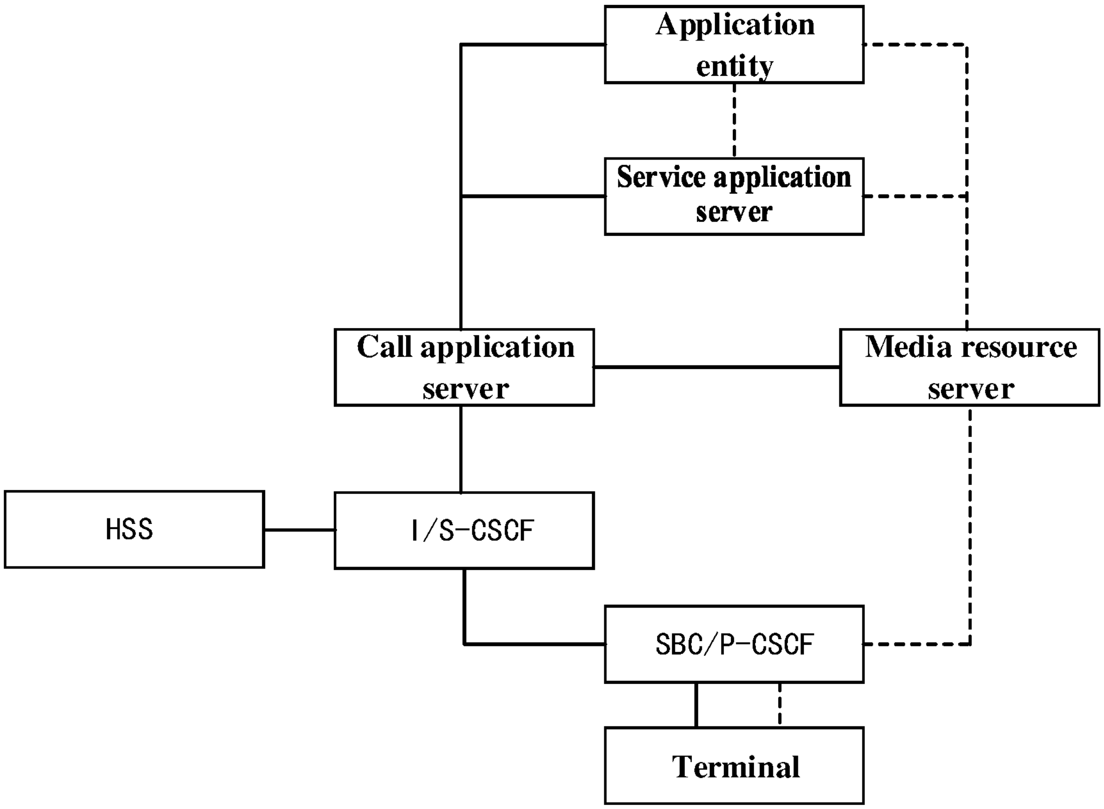
FIG. 6 is a schematic diagram of a system for implementing simultaneous interpretation in a call procedure according to an embodiment of the disclosure.

FIG. 6 shows a system for implementing simultaneous interpretation in a call procedure according to an embodiment of the disclosure. The system includes an access control entity (such as a session border controller/proxy-call session control function (SBC/P-CSCF)), a call application server, a service application server, a media resource server and an application entity. As shown in FIG. 6, the system further includes a session control entity (such as an interrogating/serving-call session control function (I/S-CSCF)) and a home subscriber server (HSS). The terminal interacts with a system on the network side to provide a user with service experience. The terminal is interfaced with the access control entity to establish a data channel. The terminal performs session negotiation of a data channel with the system such that data can be received from the system through the data channel, processed at the terminal and presented on an interface. Alternatively, data operated by users is transferred to the system through the data channel, such that specific service settings and logic settings are implemented.

The access control entity provides the terminal with access to a signaling plane and a media plane. In the disclosure, the access control entity supports session negotiation of a data channel. As a forwarding entity of the data channel, the access control entity establishes media channels, such as data channels, with the terminal and the media resource server to forward data, respectively.

The session control entity is interfaced with the access control entity and the call application server, provides the terminal with basic functions in an IMS network, such as registration and authentication, session control and call routing, and is capable of triggering a call received by the access control entity to the call application server. The home subscriber server is responsible for storing authentication information, a service trigger rule and other information of the terminal.

The call application server is respectively interfaced with the service application server, the media resource server and the application entity. As a signaling-side control network element of the system, the call application server carries an IMS call management capability. As a multi-application access capability network element, the call application server further provides opening to public of a communication capability.

As an entrance of application service settings, the service application server may provide users with entrances of query settings of different applications such that a settable application list (such as a simultaneous interpretation service list) can be returned. The service application server completes signaling interaction of service settings with the call application server and the application entity. The service application server further respectively interacts with the media resource server and the application entity to transmit service data.

As a media plane control network element of the system, the media resource server provides media services. The media resource server is interfaced with the application entity to forward application data.

The application entity is configured to provide service logic of an application. The application entity is interfaced with the call application server, obtains session event information from the call application server, and controls a session based on the simultaneous interpretation service logic.

According to the system, by improving an IMS architecture, introducing the media resource server, etc. a new media channel is established. Traditional audio and video media is anchored to the new media channel established by the media resource server. Moreover, a simultaneous interpretation function can be implemented through the data channel such that one or more parties using different languages can freely make calls. Interactive and immersive calls are provided under the new architecture. User experience is improved.

In some embodiments of the disclosure, the call application server provides management of an audio and video call and a data channel call, which includes but is not limited to call establishment, media negotiation control, call event reporting, application data reporting (such as simultaneous interpretation result reporting), etc. The call application server further provides opening to public of a communication capability, and the application entity may control new video calls and data channel calls and realize application of media service resources through an opening interface provided by the call application server. The call application server may further provide a function of managing the media resource server, and manage the media resource server based on the control instruction of the application entity, which includes but is not limited to application, modification and deletion of a data channel, application, modification and deletion of an audio and video session resource and application, modification and deletion of a voice recognition capability.

In some embodiments of the disclosure, the media service provided by the media resource server includes but is not limited to media capability management, data channel management and application data forwarding. For media capability management provided by the media resource server, the media resource server is respectively interfaced with network elements such as the call application server, the application entity, the access control entity and the service application entity, and is responsible for establishing, modifying and deleting media resources. For data channel management, the media resource server is responsible for establishing, modifying and deleting a data channel. For application data forwarding, the media resource server receives the application data from the application entity (or from the application entity via the service application server) and forwards the application data to the terminal through the data channel. Alternatively, the terminal sends the application data to the media resource server through the data channel, and the media resource server extracts the application data (or the media resource server forwards the application data to the service application server and the service application server extracts the application data) and forwards the application data to the application entity.

In some embodiments of the disclosure, control over a session by the application entity includes but is not limited to modifying a media path of the session. The application entity may modify the media path of the session and anchor the session media to the media resource server. In addition, the call application server informs the application entity of a session event and simultaneous interpretation service data. The application entity is interfaced with the media resource server, sends application data to the terminal through the data channel, and may further receive application data received from the terminal through the data channel. The application entity is interfaced with the service server, processes service data sent by the service server through the data channel, and completes service settings.

In some embodiments of the disclosure, taking a user using the data channel to perform the simultaneous interpretation service as example, the service setting takes an IMS as a communication network and an SIP protocol as a communication protocol, and other signaling systems are also applicable. The application entity subscribes a call status of the terminal from the call application server by the service application server, and calls the application servicer to feed back reply information after the call status is successfully subscribed.

When a calling terminal initiates a call, a call signaling is transmitted to the access control entity, and then the access control entity forwards the request to a session control entity. The session control entity triggers the request to the call application server. The call application server informs the application entity of the call status of the terminal. The application entity replies a call status response and instructs the call application server to establish a data channel.

After the data channel is successfully established, the call application server informs the application entity. A service list including simultaneous interpretation may be queried on a display interface of the calling terminal. The application entity instructs the call application server to continue to make a call, and the call application server calls the called terminal.

The calling terminal initiates a simultaneous interpretation request, and sends a simultaneous interpretation service setting request to the application entity through the data channel. The application entity asks the service server to execute the simultaneous interpretation service. The service application server initiates a request of establishing simultaneous interpretation media resource to the call application server. The call application server replies with a response. The call application server requests a media resource from the media resource server, and anchors the point-to-point audio and video call media between the calling terminal and the called terminal to the media channel requested by the media resource server.

The call application server instructs the media resource server to execute a simultaneous interpretation service. The media resource server performs voice recognition on a received voice media stream of a called terminal, and informs the call application server of a voice recognition result. The call application servicer informs the service application server of text in a target language after simultaneous interpretation. The service application server informs the application entity of a processing result of the simultaneous interpretation service. The application entity displays text translated into the target language on the called terminal through the data channel. For instance, audio of an original voice is synchronously translated in a form of subtitles.

The traditional audio and video media is anchored to the media server. After the voice recognition and translation, a simultaneous interpretation function is implemented on the network side through the data channel. Interactive and immersive calls under an IMS architecture can be provided. One or more parties using different languages can freely make calls through real-time translation in the call procedures.

An embodiment of the disclosure further provides a computer-readable storage medium. The computer-readable storage medium stores a computer-executable instruction. The computer-executable instruction is configured to execute the method in the above embodiments.

According to an embodiment of the disclosure, in an audio and video call procedure between a calling terminal and a called terminal, a simultaneous interpretation request is received through a data channel, and a voice media stream is translated into a target language by anchoring point-to-point audio and video call media to a new media channel such that simultaneous interpretation can be implemented on a network side. Thus, simultaneous interpretation can be implemented on the network side in the embodiment of the disclosure, one or more parties using different languages can freely make calls without participation of multiple parties in the call or support of a voice recognition application on the terminal side, and convenience is provided for users.

As a non-transient computer-readable storage medium, the memory may be configured to store a non-transient software program and a non-transient computer-executable program. In addition, the memory may include a high-speed random access memory, and a non-transient memory, such as at least one disk memory device, at least one flash memory device or other non-transient solid-state memory devices. In some embodiments, the memory may include memories remotely arranged relative to a processor, and these remote memories may be interfaced with the processor by networks. Instances of the above networks include but are not limited to the internet, an enterprise intranet, a local area network, a mobile communication network and their combinations.

The mobile communication device embodiments described above are merely schematic. Units described as separate components may be physically separated or not. That is, the units may be located at one place, or distributed over a plurality of network units. Some or all of modules may be selected according to actual requirements to achieve the objective of the solution of the embodiments.

Those of ordinary skill in the art may understand that all or some steps and systems in the method disclosed above may be implemented as software, firmware, hardware and their appropriate combinations. Some or all physical assemblies may be implemented as software executed by a processor, such as a central processing unit, a digital signal processor or a microprocessor, or as hardware, or as an integrated circuit, such as an application specific integrated circuit. Such software may be distributed over a computer-readable medium. The computer-readable medium may include a computer storage medium (or a non-transitory medium) and a communication medium (or a transitory medium). As well known to those of ordinary skill in the art, the term "computer storage medium" includes volatile, nonvolatile, removable and non-removable media implemented in any method or technology for storing information (such as a computer-readable instruction, a data structure, a program module or other data). The computer storage medium includes but is not limited to a random-access memory (RAM), a read-only memory (ROM), an electrically erasable programmable read-only memory (EEPROM), a flash memory or other memory technologies, a compact disk read-only memory (CD-ROM), a digital versatile disk (DVD) or other optical disk storages, a magnetic cassette, a magnetic tape, a magnetic disk storage or other magnetic storage apparatuses, or any other medium that can be used to store desired information and can be accessed by a computer. In addition, it is well known to those of ordinary skill in the art that a communication medium generally contains a computer-readable instruction, a data structure, a program module or other data in, for instance, a carrier wave or a modulated data signal of other transmission mechanisms, and can include any information delivery medium.

Some implementations of the disclosure are particularly described above, but the disclosure is not limited to the above embodiments. Those skilled in the art can make various equivalent deformations or substitutions without departing from the scope of the disclosure. These equivalent deformations or substitutions are included in the scope defined by the claims of the disclosure.

I claim:

1. A method for implementing real time voice recognition and translation in a call procedure, comprising:
  - establishing a data channel after receiving a call request;
  - receiving, a request for real time voice recognition and translation that is initiated by a terminal through the data channel;
  - anchoring call media to a new media channel;
  - sending a voice media stream for real time voice recognition and translation through the new media channel;
  - receiving a recognition and translation result through the data channel; and
  - sending the received recognition and translation result to the terminal.

2. The method according to claim 1, wherein the method further comprises, before establishing the data channel based on the received call request:
  - subscribing a call status of the terminal.

3. The method according to claim 1, wherein establishing the data channel based on the received call request comprises:
  - receiving a call request from the terminal;
  - performing a reporting operation of a call status of the terminal; and
  - responding to the call status of the terminal and establishing the data channel.

4. The method according to claim 1, wherein anchoring the call media to the new media channel comprises:
  - requesting a media resource and establishing the new media channel; and
  - executing an anchoring operation to anchor the call media to the media channel.

5. The method according to claim 1, further including:
  - performing voice recognition on a received voice media stream; and
  - translating the voice media stream after the voice recognition into a target language.

6. The method according to claim 5, wherein translating the voice media stream after the voice recognition into the target language comprises:
  - receiving language information from the terminal; and
  - translating the voice media stream based on the language information.

7. The method according to claim 1, further comprising displaying, on the terminal, the real time voice recognition and translation result.

8. The method according to claim 7, wherein the real time voice recognition and translation result is displayed in a form of subtitles.

9. A system for implementing simultaneous interpretation in a call procedure, comprising an access control entity, a call application server, a service application server, a media resource server and an application entity; wherein
  - the access control entity is configured to respectively establish channels with a terminal and the media resource server;
  - the call application server is respectively interfaced with the service application server, the media resource server and the application entity;
  - the service application server is configured to perform signaling interaction with the call application server and the application entity, and the service application server is configured to perform data transmission with the media resource server and the application entity; and
  - the media resource server is interfaced with the application entity and configured to forward application data;
  - the call application server is configured to establish a data channel after receiving a call request;
  - the application entity is configured to receive request for real time voice recognition and translation that is initiated by the terminal through the data channel;
  - the media resource server is configured to anchor call media to a new media channel;
  - the media resource server is configured to send a voice media stream for real time voice recognition and translation through the new media channel;

the application entity is configured to receive a recognition and translation result through the data channel; and the application entity is configured to send the received recognition and translation result to the terminal.

10. The system according to claim 9, wherein the call application server is configured to provide management of audio and video calls and a data channel call, opening to public of a communication capability, and management on the media resource server.

11. The system according to claim 9, wherein a media service provided by the media resource server comprises:

media capability management, data channel management and application data forwarding.

12. The system according to claim 9, wherein the application entity performs control over a session, and the control comprises but is not limited to:

modifying a media path of the session.

13. A non-transitory computer-readable storage medium, storing a computer-executable instruction, wherein the computer-executable instruction is configured to:

establish a data channel based on a received call request;

receive a request for real time voice recognition and translation that is initiated by a terminal through the data channel;

anchor call media to a new media channel;

send a voice media stream for real time voice recognition and translation through the new media channel;

receive a recognition and translation result through the data channel; and send the received recognition and translation result to the terminal.

14. The non-transitory computer-readable storage medium according to claim 13, wherein the computer-executable instruction is further configured to, before establishing the data channel based on the received call request:

subscribe a call status of the terminal.

15. The non-transitory computer-readable storage medium according to claim 13, wherein the computer-executable instruction being configured to establish the data channel based on the received call request comprises being configured to:

receive a call request from the terminal;

perform a reporting operation of a call status of the terminal; and respond to the call status of the terminal and establishing the data channel.

16. The non-transitory computer-readable storage medium according to claim 13, wherein the computer-executable instruction being configured to anchor the call media to the new media channel comprises being configured to:

request a media resource and establish the new media channel; and execute an anchoring operation to anchor the call media to the media channel.

17. The non-transitory computer-readable storage medium according to claim 13, wherein the computer-executable instruction being further configured to:

perform voice recognition on a received voice media stream; and translate the voice media stream after the voice recognition into a target language.

18. The non-transitory computer-readable storage medium according to claim 17, wherein the computer-executable instruction being configured to translate the voice media stream after the voice recognition into the target language comprises being configured to:

receive language information from the terminal; and translate the voice media stream based on the language information.

19. The non-transitory computer-readable storage medium according to claim 13, wherein the computer-executable instruction is further configured to display, on the terminal, the real time voice recognition and translation result.

20. The non-transitory computer-readable storage medium according to claim 19, wherein the real time voice recognition and translation result is displayed in a form of subtitles.

* * * * *